United States Patent [19]

Göhl et al.

[11] Patent Number: 4,903,641

[45] Date of Patent: Feb. 27, 1990

[54] METHOD AND APPARATUS FOR EXTRACTING SATURATED STEAM IN THE SYNTHESIS OF HYDROGEN CHLORIDE GAS

[75] Inventors: Eduard Göhl; Johann Müller; Alois Spaderna, all of Meitingen, Fed. Rep. of Germany

[73] Assignee: Sigri GmbH, Meitingen, Fed. Rep. of Germany

[21] Appl. No.: 316,415

[22] Filed: Feb. 27, 1989

[30] Foreign Application Priority Data

Mar. 5, 1988 [DE] Fed. Rep. of Germany ....... 3807264

[51] Int. Cl.⁴ .............................................. F22B 1/02
[52] U.S. Cl. ...................................... 122/33; 422/138
[58] Field of Search ........................... 122/32, 33, 4 R; 126/263; 422/138; 423/645

[56] References Cited

U.S. PATENT DOCUMENTS 4,070,861 1/1978 Scragg et al. .................. 126/263 X
4,146,057 3/1979 Friedman et al. ................. 122/33 X

FOREIGN PATENT DOCUMENTS 857343 11/1952 Fed. Rep. of Germany .
1098493 8/1961 Fed. Rep. of Germany .
3313761 5/1987 Fed. Rep. of Germany .

*Primary Examiner*—Edward G. Favors
*Attorney, Agent, or Firm*—Herbert L. Lerner; Laurence A. Greenberg

[57] ABSTRACT

A method and apparatus for generating saturated steam by the combustion of chlorine and hydrogen to produce hydrogen chloride gas includes combusting chlorine and hydrogen to produce hydrogen chloride gas in an elongated synthesis oven having an upper segment, a lower segment and a middle segment having a walll in the form of a heat exchanger. A heat transfer medium is recirculated between the heat exchanger and a steam generator while heating the heat transfer medium to between 170° and 230° C. by heat exchange between the heat of the combustion and the heat transfer medium. Saturated steam is generated from water at a pressure of at least 7 bar in the steam generator.

7 Claims, 1 Drawing Sheet

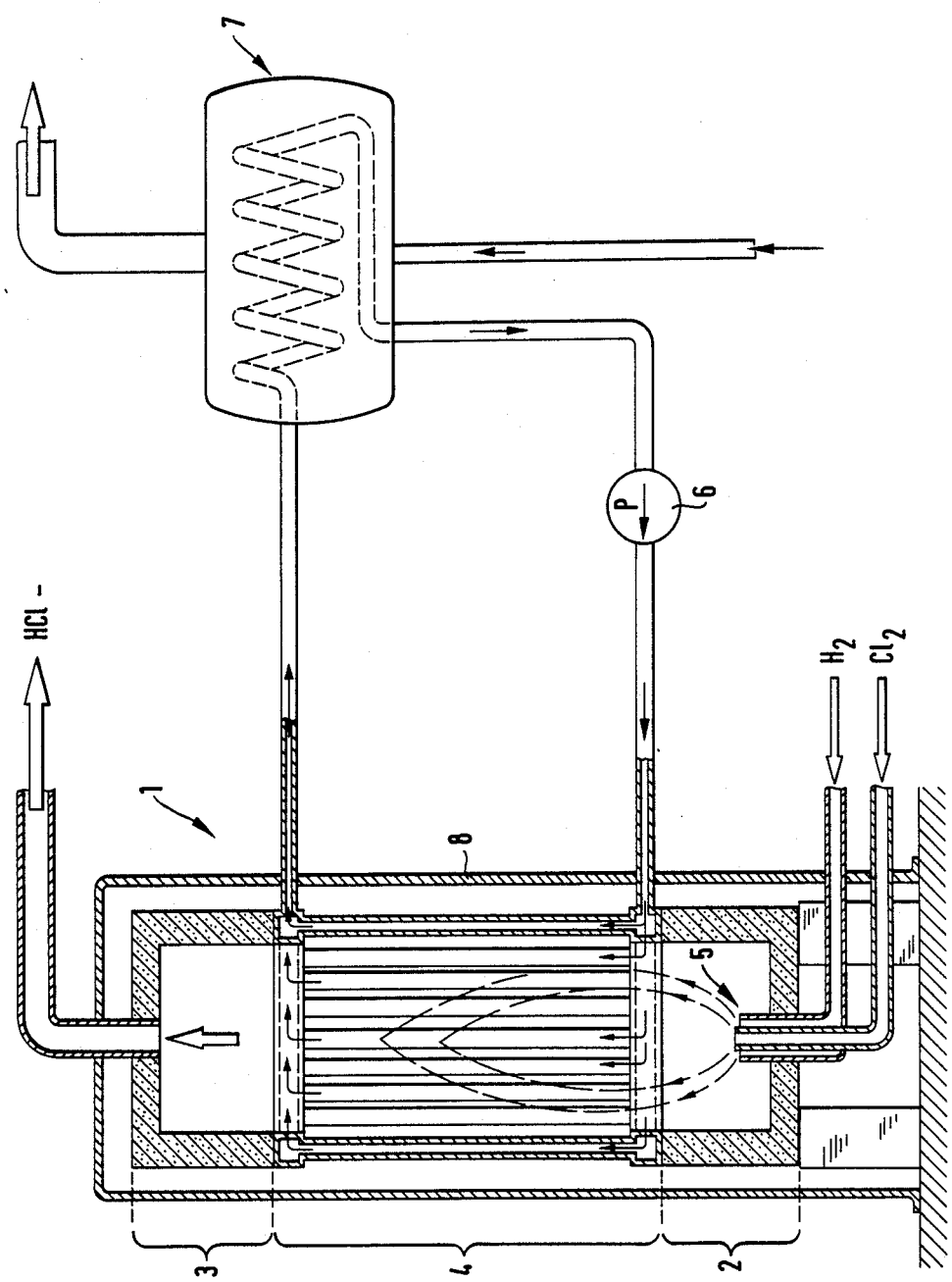

METHOD AND APPARATUS FOR EXTRACTING SATURATED STEAM IN THE SYNTHESIS OF HYDROGEN CHLORIDE GAS

BACKGROUND OF THE INVENTION

1. Field of the Invention

The invention relates to a method and an apparatus for extracting saturated steam formed by the heat of combusting chlorine and hydrogen to produce hydrogen chloride gas in an elongated synthesis oven, the oven including a plurality of segments, and the steam being formed therein by heat exchange between the product of combustion and a heat transfer medium.

2. Description of the Related Art

For the synthesis of gaseous hydrogen chloride from the elements chlorine and hydrogen or from chlorinated hydrocarbons mixed with chlorine, the reaction mixtures are combusted in a substantially hollow, cylindrical oven, in the course of which considerable quantities of heat are produced (approximately 92 kJ/mol of HCl).

The hydrogen chloride gas produced is cooled and generally absorbed by water in an absorber that follows. The oven used for performing the synthesis is made substantially of graphite. Several methods are known for recovering and utilizing the heat liberated in the hydrogen chloride combustion synthesis, for example the indirect cooling of the hydrogen chloride gas in heat exchange with a water circulation loop (German Patent No. DE-PS 857 343). The limited temperature increase to approximately 55° C. substantially restricts the utility of the heat. In another method, it is known to cool hydrogen chloride gas in a first heat exchange to approximately 200° C. with water carried in a circulation loop, to extract some of the absorption heat in a second heat exchange, and to effect flash evaporation of at least some of the heated water in heat exchange with the first loop (German Patent No. DE-PS 33 13 761). In this process, steam is produced at a temperature of approximately 134° C. and a vapor pressure of approximately 3.5 bar which can be used industrially, for instance as process steam.

However, the apparatus required for performing this method, and particularly the adaptation of the quantities of heat extracted at two locations make adaptation to changing operating conditions and changes in the heat requirement difficult.

SUMMARY OF THE INVENTION

It is accordingly an object of the invention to provide a method and apparatus for extracting saturated steam in the synthesis of hydrogen chloride gas, which overcomes the hereinafore-mentioned disadvantages of the heretofore-known methods and devices of this general type, by utilizing the heat produced in the synthesis of hydrogen chloride gas to extract process steam in a single method step.

With the foregoing and other objects in view there is provided, in accordance with the invention, a method for generating saturated steam by the combustion of chlorine and hydrogen to produce hydrogen chloride gas, which comprises combusting chlorine and hydrogen to produce hydrogen chloride gas in an elongated synthesis oven having an upper segment, a lower segment and a middle segment having a wall in the form of a heat exchanger, recirculating a heat transfer medium between the heat exchanger and a steam generator while heating the heat transfer medium to between 170° and 230° C. by heat exchange between the heat of the combustion and the heat transfer medium, and generating saturated steam from water at a pressure of at least 7 bar in the steam generator.

In accordance with another mode of the invention, there is provided a method which comprises recirculating water as the heat transfer medium. Suitable heat transfer media are commercial thermal oils as well as water.

As compared with known methods, the essential improvement is that heat at a comparatively high temperature level is extracted directly from the synthesis oven. The known synthesis ovens are substantially lined with synthetic resin-impregnated graphite bricks, because without such an impregnation, the graphite lining can be penetrated by the reaction product. However, synthetic resin-impregnated graphite bricks are only resistant to approximately 160° C., and they must be cooled to that temperature, for example by water flowing through the annular gap between the graphite lining and a steel jacket surrounding the lining (German Patent No. DE-PS 10 98 493). Reliable cooling of the graphite lining under these conditions, permits only comparatively low water temperatures, which are inadequate to generate saturated steam. According to the invention, the use of the synthesis oven lining with such impregnated graphite bricks that are only resistant at relatively low temperatures is restricted to those parts of the oven where corrosive damages of metallic materials triggered by condensation of combustion products are possible. Thus, only the upper and lower segments, sections or regions of the synthesis oven are lined with such graphite bricks.

The central segment at the higher temperature is formed of a metal material, particularly resistant steel, and contains tubes which are part of a closed circulation loop through which a heat transfer medium flows. This metal segment of the synthesis oven can be heated to a substantially higher temperature without thermal damage as compared to prior art ovens or oven segments lined with graphite. The heat transfer medium in the tubes of the central region is heated to higher temperature levels by heat exchange in this segment of the synthesis oven. Such levels enable the generation of process steam at pressures of at least 7 bar.

With the objects of the invention in view, there is also provided an apparatus for generating saturated steam by the combustion of chlorine and hydrogen to produce hydrogen chloride gas, comprising an elongated synthesis oven in which chlorine and hydrogen are combusted to produce hydrogen chloride gas, said synthesis oven having upper and lower segments being lined with impregnated graphite and a middle segment having a wall in the form of a metal heat exchanger section, a steam generator connected to said heat exchanger section in a closed circuit, and means for recirculating a heat transfer medium between said heat exchanger section and said steam generator, while heating the heat transfer medium to between 170° and 230° C. by heat exchange between the heat of the combustion and the heat transfer medium and generating saturated steam from water at a pressure of at least 7 bar in said steam generator.

In accordance with a further feature of the invention, the wall of said heat exchanger section is an inner wall formed at least partly of tubes. The tubes through which the heat transfer medium flows may also be located along the inner wall of the middle or central segment of the synthesis oven. In accordance with an added feature of the invention, the tubes are finned tubes welded to one another.

In accordance with an additional feature of the invention, the middle segment is formed of concentrically disposed, spaced-apart jackets or double shells or courses. The inner jacket is corrugated to improve the heat transfer. In this structure, the heat transfer medium flows through the annular gap or space between the surfaces of the concentric jacket. The annular space preferably contains baffle plates and the like to improve heat distribution.

In accordance with a concomitant feature of the invention, the upper segment includes an annular channel projecting outwardly beyond said middle segment for diverting condensate from said middle segment.

During operation of the synthesis oven, the heating of the middle segment, especially radiantly by the very hot burner flame, is so pronounced that condensation products that could trigger corrosion cannot be formed on its wall. This condensation corrosion cannot be precluded at the wall of the cooler upper and lower segments, so that these segments must be lined with graphite bricks. Condensate can form in these upper and lower segments, particularly upon startup of the oven, and the upper segment lined with graphite bricks is therefore preferably provided with an annular drainage collar, which diverts and protects the middle zone from any condensate that might drip onto it or run down onto it.

Other features which are considered as characteristic for the invention are set forth in the appended claims.

Although the invention is illustrated and described herein as embodied in a method and apparatus for extracting saturated steam in the synthesis of hydrogen chloride gas, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The drawing is a fragmentary, diagrammatic, partly cross-sectional view of an apparatus according to the invention.

Referring now in detail to the single FIGURE of the drawing, it is seen that the apparatus for performing the method includes a synthesis oven 1 with a lower segment 2 and an upper segment 3, both of which are lined with graphite bricks and are provided with non-illustrated sprinkler cooling means. The middle or central segment 4 is formed of steel and is constructed as a heat exchanger in the form of finned tubes welded to one another. A burner inlet 5 is disposed at the lower segment 2 of the oven, and in it chlorine and hydrogen are combusted. The maximum reaction temperature is reached in the volume surrounded by the middle portion. The hydrogen chloride gas which is formed is removed from the synthesis oven in the upper segment 3 and processed further in a non-illustrated manner to make aqueous hydrochloric acid. All of the segments 2, 3 and 4 of the synthesis oven are enclosed by a jacket 8.

The coolant of the middle segment 4 of the synthesis oven, which is the heat exchanger section, flows through a closed loop that includes a steam generator 7 and a recirculating pump 6. The temperature of the heat exchange medium upon emerging from the segment 4 of the synthesis oven is from 170° to 230° at a presusre of 9 to 27 bar. This heated medium transfers its heat to water introduced into the steam generator 7 through a water injector 9 and the saturated steam generated at the generator 7 is led to utilization sites through a duct 10. In a medium-performance synthesis oven, approximately 600 m³/h of medium are recirculated. The foregoing is a description corresponding in substance to German Application No. P 38 07 264.5, dated Mar. 5, 1988, the International priority of which is being claimed for the instant application, and which is hereby made part of this application. Any material discrepancies between the foregoing specification and the aforementioned corresponding German application are to be resolved in favor of the latter.

We claim:

1. A method for generating saturated steam by the combustion of chlorine and hydrogen to produce hydrogen chloride gas, which comprises combusting chlorine and hydrogen to produce hydrogen chloride gas in an elongated synthesis oven having an upper segment, a lower segment and a middle segment having a wall in the form of a heat exchanger, recirculating a heat transfer medium between the heat exchanger and a steam generator while heating the heat transfer medium to between 170° and 230° C. by heat exchange between the heat of the combustion and the heat transfer medium, and generating saturated steam from water at a pressure of at least 7 bar in the steam generator.

2. The method according to claim 1, which comprises recirculating water as the heat transfer medium.

3. An apparatus for generating saturated steam by the combustion of chlorine and hydrogen to produce hydrogen chloride gas, comprising an elongated synthesis oven in which chlorine and hydrogen are combusted to produce hydrogen chloride gas, said synthesis oven having upper and lower segments being lined with impregnated graphite and a middle segment having a wall in the form of a metal heat exchanger section, a steam generator connected to said heat exchanger section in a closed circuit, and means for recirculating a heat transfer medium between said heat exchanger section and said steam generator, while heating the heat transfer medium to between 170° and 230° C. by heat exchange between the heat of the combustion and the heat transfer medium and generating saturated steam from water at a pressure of at least 7 bar in said steam generator.

4. The apparatus according to claim 3, wherein said wall of said heat exchanger section is an inner wall formed of tubes.

5. The apparatus according to claim 4, wherein said tubes are finned tubes welded to one another.

6. The apparatus according to claim 3, wherein said middle segment is formed of concentrically disposed, spaced-apart jackets.

7. The apparatus according to claim 3, wherein said upper segment includes an annular channel projecting outwardly beyond said middle segment for diverting condensate from said middle segment.

* * * * *